Nov. 2, 1965   W. L. McKENICA   3,214,805
METHOD OF PREPARING FINE METAL WIRES
Filed June 23, 1960
FIG. 1
FIG. 2
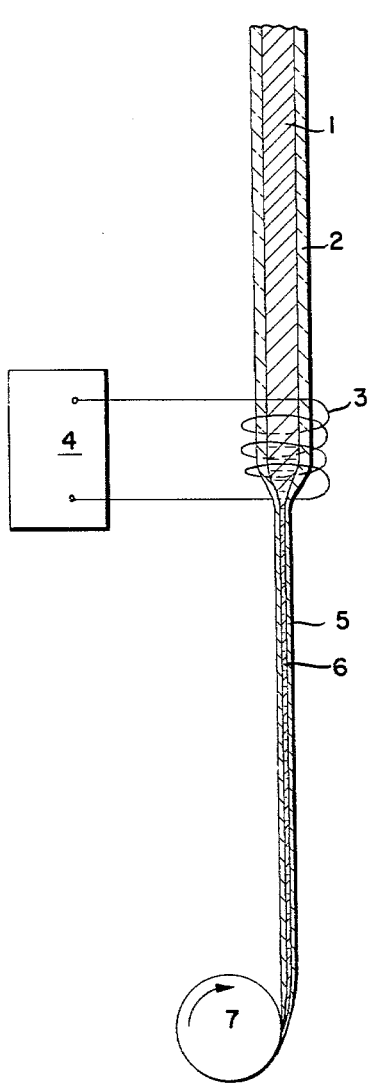
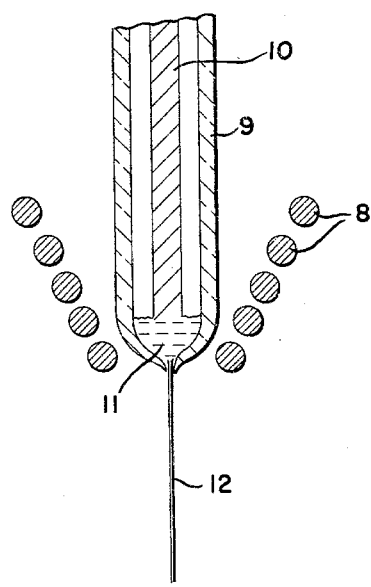
INVENTOR
WINFIELD LEWIS MC KENICA
BY
ATTORNEY United States Patent Office 3,214,805
Patented Nov. 2, 1965

3,214,805
METHOD OF PREPARING FINE METAL WIRES
Winfield Lewis McKenica, Wilmington, Del., assignor to E. I. du Pont de Nemours and Company, Wilmington, Del., a corporation of Delaware
Filed June 23, 1960, Ser. No. 38,140
5 Claims. (Cl. 22—200.1)

This invention relates to a new and useful method of preparing fine metal wires.

Metal wire has long been made by drawing metal rods through dies. The metal rods are heat-treated, cleaned, and drawn in several stages to reduce the area and develop high tensile properties. A practical cross-sectional area reduction of 27% per die is common for high-carbon steel with a total area reduction of 85% between heat-treating steps. In the final drawing operation, a total area reduction of as high as 96% is used to obtain maximum tenacity.

It is apparent that very fine wires are far more expensive than coarse wires because fine wires require additional processing steps.

It has been proposed [in an article by G. F. Taylor in "Physical Review" 23, 655 (1924)] to prepare fine wires by heating a capillary glass tube (0.5–1 mm. in diameter) containing metal in a flame or heating block and drawing a fine filament therefrom. This batch process is extremely difficult to control and gives products of variable denier (or gauge) due to the overheating of the glass leading to devitrification, decomposition, and too low a melt viscosity which makes the drawing variable. Alternately, too low a temperature causes discontinuities in the glass and/or metal. Such a method, even under the best conditions, does not afford continuous lengths of wire.

It has been proposed (2,825,108) to extrude a melted metal through an orifice to produce fine wires but the construction of spinnerets or dies for use with the higher melting metals of commercial interest has been an insurmountable obstacle.

Accordingly, it is an object of this invention to provide a process for making fine metal filaments.

Another object is to provide a process for the preparation of insulated fine wires.

One aspect of the invention comprises continuously passing a glass-incased metal rod through the heating zone of an induction heater. The metal is melted and heats the surrounding glass by conduction thereby softening it to the point where it can be drawn. A fine metal filament surrounded by glass is drawn continuously from the heating zone.

A bare metal wire is obtained by cooling a glass sheath-metal core filament when the glass selected has a softening point at least about 100° C. greater than the melting point of the metal. The same results can be obtained by rapidly quenching the drawn product wherein the glass has a softening point below or near the melting point of the metal.

The invention may be best understood by reference to the following description taken in connection with the accompanying drawings, in which:

FIGURE 1 is a general layout of apparatus for continuous production of glass-coated, fine, metal wire in which a schematically illustrated coil is used to inductively heat the metal of the glass-enclosed rod fed to the apparatus;

FIGURE 2 is a general layout for apparatus for continuous production of fine metal wire showing a conical arrangement of the induction coil turns.

Referring to the drawings in greater detail, FIGURE 1 illustrates passage of glass 2 encased metal rod 1 from a source through induction coil 3 which induces heating currents therein to melt the metal. The energy output to the coil may be supplied by a power supply 4 of conventional type. Glass 5 encased fine, metal wire 6 is drawn off from the hottest zone within the induction coil, i.e., where the metal is molten and the glass has softened sufficiently to be drawn, and wound up on a bobbin 7.

FIGURE 2 incorporates a cross-sectional view of an inductance coil 8 in which the turns are arranged in the shape of a cone. The glass 9 encased metal rod 10 shown in the figure illustrates a loose fit between metal and glass. The molten pool of metal 11 softens the surrounding glass and the combination is drawn away from said zone. FIGURE 2 exemplifies the condition where the glass coating fractures off the fine filament at a point below the heating coils, leaving bare fine metal wire 12 which is then wound on a spool.

The term "glass" includes the usual silicates, borates, phosphates, and fusible oxides or salts as is commonly known in the art. Heat-softenable or thermoplastic materials may be used such as salts, for example sodium fluoride/boric oxide (2,823,095), which afford a structure with a sensible strength when cast or extruded from a melt and which can serve as a temporary sheath (or casting mold) for the spinning of filaments by this invention. The glass should be selected so that it is inert towards the molten metal at the temperatures used in the process. In general, the glass should not contain an oxide that can be reduced by the molten metal used. The glass should have a softening point [as defined in "J. American Ceramics Society" 10, 259 (1927)] below that of the boiling point of the metal. Preferably, the softening point of the glass should be within 400° C. of the melting point of the metal. Examples I and II show combinations of metal melting points and glass softening temperatures of 1083/820° C. and 1385/1500° C. respectively.

In order to be flexible, the wall thickness of the glass sheath on the final product should preferably be no thicker than about 0.003 inch. The maximum wall thickness of the initial glass tube should be selected in view of the area reduction in the process ($10^2:1$ to $10^5:1$) and will normally be within 0.010 to 0.125 inch. In general, the initial glass tube should have a wall thickness of at least .008 inch. The selection of proper combination of glasses and metals will be obvious to one skilled in the art.

The metal is conveniently used in the form of a $1/16$ to $1/8$ inch rod which is readily available at low cost as compared to higher gauge wires. The metal rod may be tightly or loosely enclosed by the glass sheath. A snug fit is preferred. For some metals, it may be preferable to replace any air in the tube between the glass wall and the metal rod with an inert gas to avoid undesirable oxidation in the process. The process is particularly useful with metals melting at 600° C. to 1800° C. such as aluminum, silver, gold, copper, beryllium, nickel, chromium, iron and their alloys and the like.

The diameter of the metal fiber is controlled by the inside diameter of the initial glass sheath, the windup speed, the rate at which the metal-glass structure is fed to the heating zone, and the amount of heat supplied to the composite structure.

Precise control of the rate of feeding the glass-incased metal rod to the heating zone, the windup speed and the amount of heat supplied is necessary in order to produce uniform filaments in a continuous process. The metal should be maintained as a molten pool within the volume of concentration of heat by the induction coils. Heat transfer from the molten metal to the glass sheath depends on the ratio of the masses of molten metal and the surrounding glass and the temperature difference between these two materials.

Too large a mass ratio and too high a temperature difference will overheat the glass sheath and lower its viscosity. This produces thin spots in the sheath and/or poor spinning continuity. The use of too little heat will cause the disruption of the metal portion of the filament and/or the glass sheath interrupting spinning continuity.

In general, the windup speeds and the heating rates are selected so that the area of the initial metal rod is reduced by a factor of 100:1 to 100,000:1 and preferably 1,000:1 to 100,000:1.

The invention is of greatest advantage in making fine metal filaments having a diameter of 0.1 mil or less to 10 mil. When spinning filaments of higher diameter (e.g., 2–20 mils), it may be necessary to quench the threadline with a stream of a cooling medium.

*Example I*

A length of No. 14 soft copper wire (OFHC made by the Malin Co. of Cleveland, Ohio) is straightened by stretching from an original diameter of 0.064 inch to a diameter of 0.061 inch. This wire is placed in a pyrex glass tube with an inside diameter of 0.079 inch and an outside diameter (O.D.) of 0.116 inch with one end sealed. The glass tube containing the wire is then fed through the coil of an induction heater which melts the copper which in turn heats the glass. A composite filament (0.003 inch O.D.) comprising a 0.0015 inch diameter copper wire uniformly covered with a coating of glass is drawn off at 100 yards per minute and wound up on a 4-inch diameter bobbin.

An apparatus similar to that shown in FIGURE 1 is used. The induction coil is constructed of ⅛ inch O.D. copper tubing through which water is circulated for cooling purposes. The coil has four turns in the shape of a cone similar to that shown in cross section in FIGURE 2. This coil is connected to the output of a high frequency generator (Lepel Model TWH made by the Lepel High Frequency Laboratories, Inc., located at Woodside 77, New York, N.Y.). The power output of the induction heater (750 watt maximum) is adjusted so that there is a pool of molten metal at the proper temperature within the height covered by the lower heating coil. Precise control is maintained on three variables: power to the coil, feed rate of the tube, and windup speed of the drawn product. The spinning is continuous and the product is very uniform.

Too high a temperature results in a larger pool of molten metal than is necessary and leads to too high a temperature of the glass by conduction from the metal which makes control of the final product more difficult. Too low a temperature obviously prevents continuous spinning or casting of the metal filament by this technique.

The glass-coated copper filaments, which have the appearance of bright copper wires, have a tenacity of 1.06 grams per denier with an elongation at the break of 0.7%. Metallographic examination shows the copper to have a cast structure. These filaments can be used as insulated wires which are especially suited for miniaturized circuits. Coils of the wires may be wound directly and the glass coating on the individual wires fused to make a permanent coil.

*Example II*

A length of ⅛ inch diameter No. 316 stainless steel rod is placed in a 96% silica glass tube (3/16 inch I.D. and ¼ inch O.D. Vycor brand #7900 made by Dow-Corning Co.) and continuous stainless steel filaments spun as in Example I using a modification of the apparatus as shown in FIGURE 2. The power output of the high frequency generator is adjusted to give a melt of the pool at white hot temperature. Heat is transmitted to the glass tube making it viscous enough to be drawn into a fine filament. The red hot glass coating on the wire filament shatters off in small pieces at a point just below the heating coils so that a stainless steel wire with no coating of any sort having a diameter of about 0.005 inch is wound up on the package. It is observed that the wire is strong and extremely ductile. Metallographic examination shows the wire to have a cast structure. Such wires are useful for weaving corrosion-resistant fabrics, for filters and the like.

What is claimed is:

1. A method for preparing fine metal wire comprising feeding a glass-encased metal rod into a heating zone, inductively heating the rod to melt the same thereby heat softening the surrounding glass by heat conduction from the hot metal to the point where it can be drawn, and continuously withdrawing glass-encased metal wire of reduced area from said heating zone.

2. The process of claim 1 wherein the metal rod is copper.

3. The process of claim 1 wherein the metal rod is steel.

4. A method for preparing fine metal wire comprising continuously feeding a glass-encased rod of a metal melting at 600–1800° C. into a heating zone, the softening point of the glass being within 400° C. of the melting point of the metal and below the boiling point of the metal, inductively heating the rod to melt the same thereby heat softening the surrounding glass by heat conduction from the hot metal to the point where it can be drawn and withdrawing metal wire of reduced area from said heating zone.

5. The process of claim 4 wherein the glass has a softening point at least about 100° C. greater than the melting point of the metal.

References Cited by the Examiner

UNITED STATES PATENTS

| 1,793,529 | 2/31 | Taylor | 205—21 |
| 2,538,917 | 1/51 | Sejournet et al. | 207—10.1 |
| 2,686,864 | 8/54 | Wroughton et al. | 75—10 |

OTHER REFERENCES

Physical Review, volume 23 (1924), pages 655–660.

Digest of Soviet Technology, pages 7, 8, Nr. September 1959; publisher: Engineering Information Service, Kirkham, Preston, Lancashire, England.

CHARLES W. LANHAM, *Primary Examiner.*

WILLIAM W. DYER, JR., *Examiner.*